United States Patent
Zhang et al.

(10) Patent No.: US 11,714,175 B2
(45) Date of Patent: Aug. 1, 2023

(54) CALIBRATION DEVICE

(71) Applicant: TRIPLE WIN TECHNOLOGY(SHENZHEN) CO.LTD., Shenzhen (CN)

(72) Inventors: Xiao-Fang Zhang, Shenzhen (CN); Yen-Sheng Lin, New Taipei (TW)

(73) Assignee: TRIPLE WIN TECHNOLOGY(SHENZHEN) CO. LTD., Shenzhen (CN)

(*) Notice: Subject to any disclaimer, the term of this patent is extended or adjusted under 35 U.S.C. 154(b) by 326 days.

(21) Appl. No.: 17/018,453

(22) Filed: Sep. 11, 2020

(65) Prior Publication Data

US 2022/0050189 A1 Feb. 17, 2022

(30) Foreign Application Priority Data

Aug. 12, 2020 (CN) .......................... 202010809468.0

(51) Int. Cl.
*G01S 7/497* (2006.01)
*G01S 17/89* (2020.01)
*G01S 7/481* (2006.01)

(52) U.S. Cl.
CPC .............. *G01S 7/497* (2013.01); *G01S 7/481* (2013.01); *G01S 17/89* (2013.01)

(58) Field of Classification Search
CPC ........ G01S 7/481; G01S 7/497; G01S 17/894; G01S 17/89; F16M 11/2014; F16M 11/18; F16M 11/10
See application file for complete search history.

(56) References Cited

U.S. PATENT DOCUMENTS

| | | | |
|---|---|---|---|
| 9,762,862 B1* | 9/2017 | Worley, III | H04N 9/3176 |
| 10,295,334 B2* | 5/2019 | Semmelmann | G01B 5/0014 |
| 2013/0173199 A1* | 7/2013 | Guasco | G01B 21/042 |
| | | | 702/95 |
| 2016/0291160 A1* | 10/2016 | Zweigle | G01S 7/4813 |
| 2016/0366385 A1* | 12/2016 | Chappelow | G06T 5/30 |
| 2017/0357270 A1* | 12/2017 | Russell | G06V 20/58 |
| 2019/0249985 A1* | 8/2019 | Stieff | G01S 7/4972 |
| 2019/0346257 A1* | 11/2019 | Armstrong | G06T 7/60 |
| 2019/0381670 A1* | 12/2019 | Correll | B25J 9/1697 |
| 2019/0390954 A1* | 12/2019 | Kroll | G01B 11/24 |

* cited by examiner

*Primary Examiner* — Sang H Nguyen
(74) *Attorney, Agent, or Firm* — ScienBiziP, P.C.

(57) ABSTRACT

A calibration device includes a base, a support column coupled to the base and extending in a first direction, and a crossbar coupled to the support column. The crossbar includes a positioning base and a carrier. The positioning base is fixed to the support column. The carrier is coupled to the positioning base and rotatable about a second direction perpendicular to the first direction. The carrier includes a distance sensor and a calibration platform. The calibration platform mounts a depth camera. The carrier is configured to rotate about the second direction to rotate an optical axis of the depth camera in a first calibration plane defined by the first direction and a third direction. The third direction is perpendicular to the first direction and the second direction.

5 Claims, 4 Drawing Sheets

CALIBRATION DEVICE

FIELD

The subject matter herein generally relates to calibration devices, and more particularly to a calibration device for calibrating a depth camera.

BACKGROUND

A time of flight (TOF) depth camera mainly includes a transmitter and a receiver. The transmitter is used to emit high-frequency modulated near-infrared light. After the infrared light is reflected by a surface of an object, the receiver receives the reflected light and calculates depth information according to a phase difference or time difference between the emitted light and the received light. However, due to the characteristics of the depth camera, imaging conditions, and interference from the external environment, the depth camera may have errors in the data obtained by the depth camera, so it is necessary to calibrate the depth camera.

In the related art, during calibration, it is necessary to place the depth camera before a calibration surface (such as a wall), control the depth camera to emit and receive light, and calculate the depth between the depth camera and the calibration surface. At the same time, a distance sensor is used to sense the distance between the depth camera and the calibration surface, and then the depth camera is calibrated according to the difference between the calculated depth and the sensed distance. This process requires that the light axis of the depth camera be perpendicular to the calibration surface. However, during actual calibration, the accuracy of the depth camera calibration is low due to the tilt of the calibration surface or the unequal placement of the calibration equipment.

BRIEF DESCRIPTION OF THE DRAWINGS

Implementations of the present disclosure will now be described, by way of embodiments, with reference to the attached figures.

DETAILED DESCRIPTION

Figure 1:
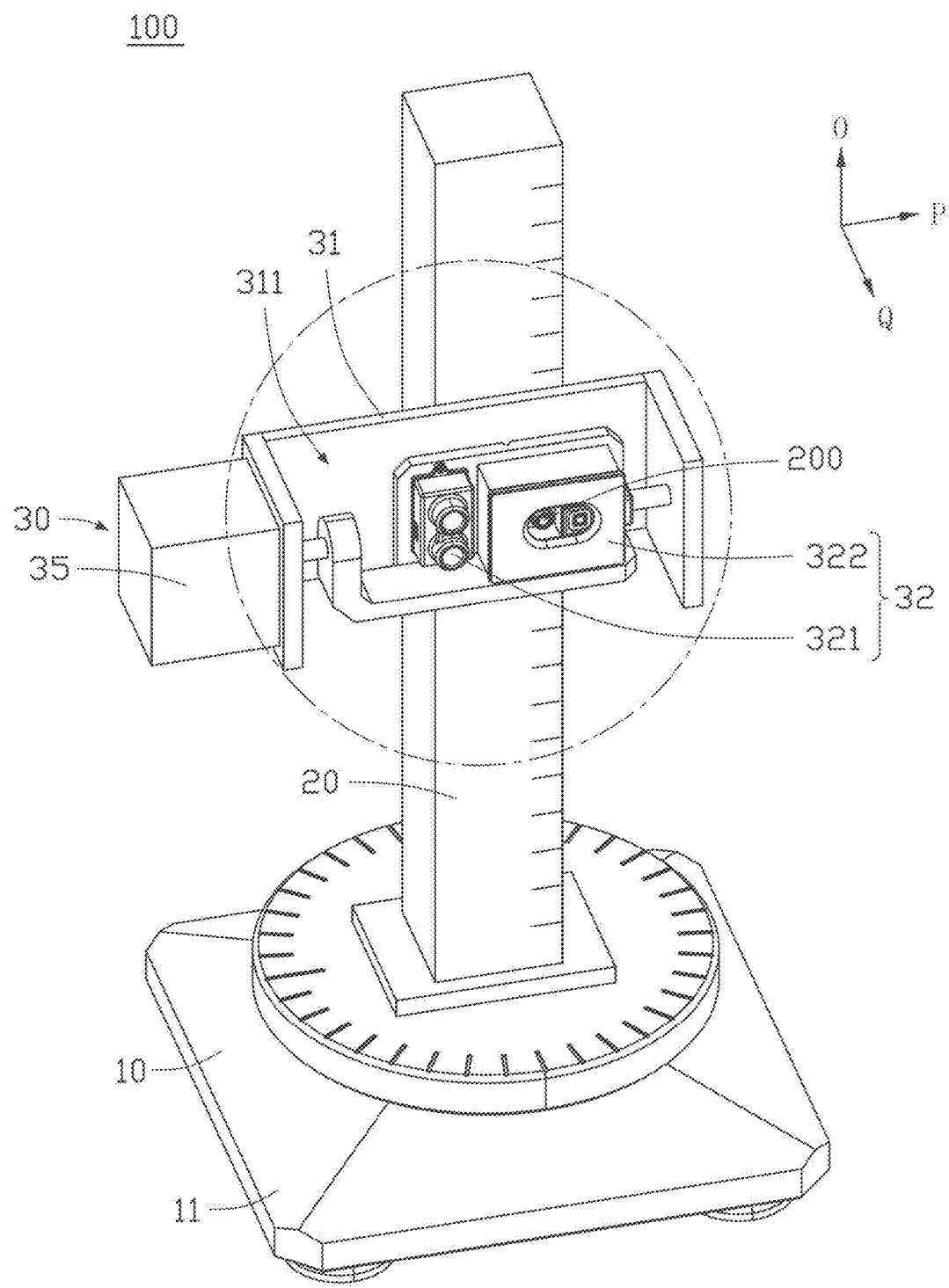
FIG. 1 is a schematic perspective diagram of an embodiment of a calibration device.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Figure 2:
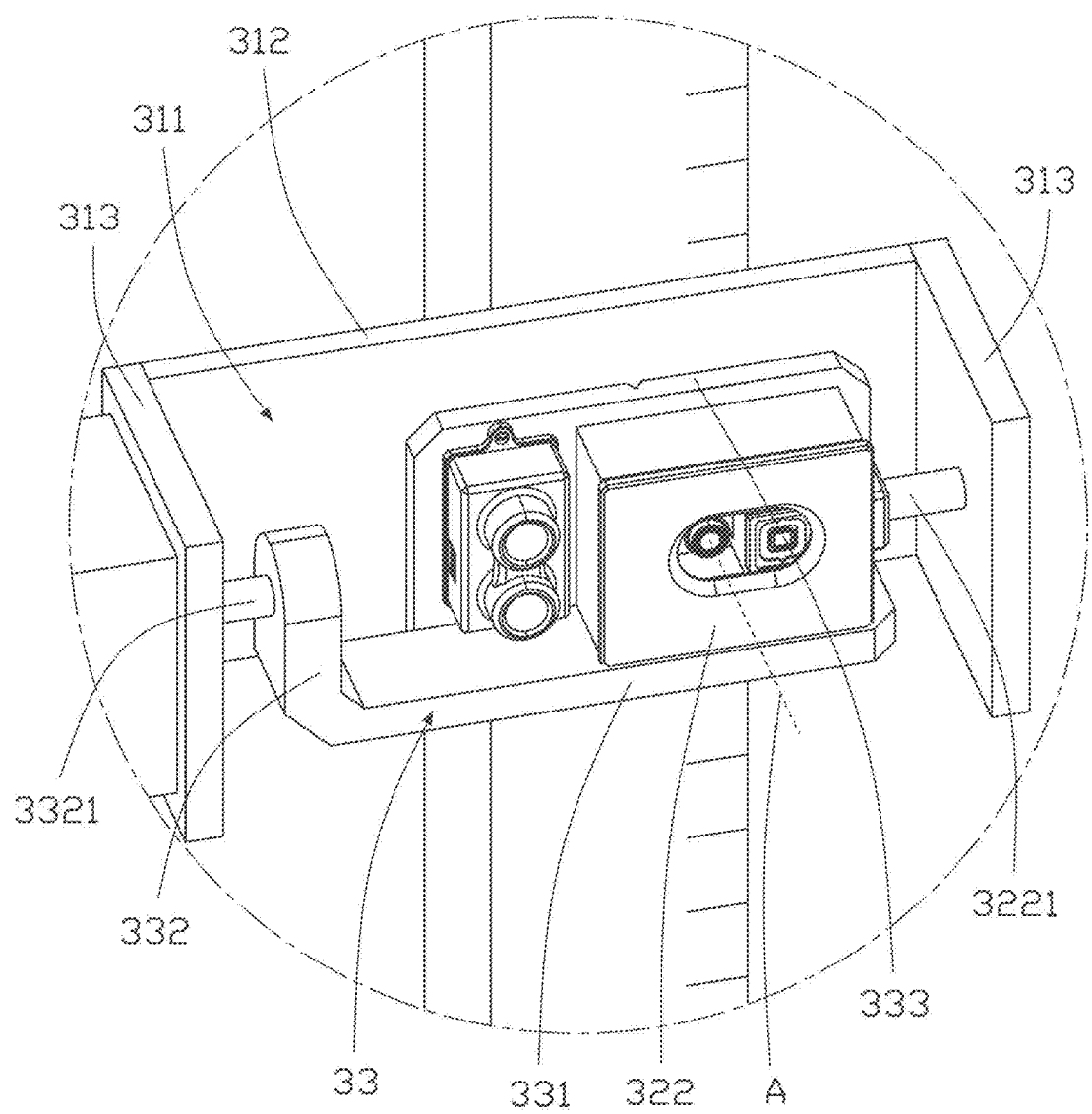
FIG. 2 is an enlarged view of a circled portion in FIG. 1.
Figure 3:
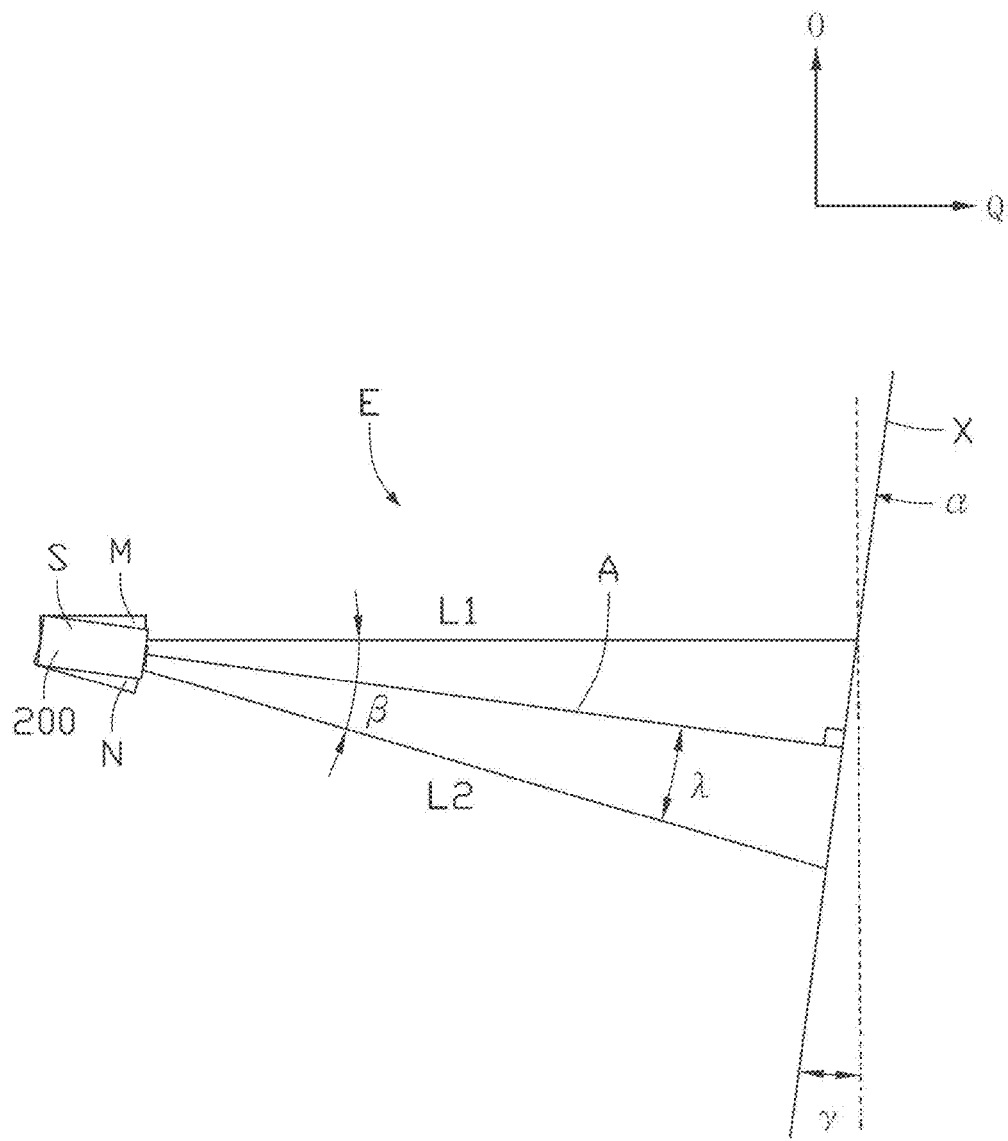
FIG. 3 is a schematic diagram of a calibration principle of the calibration device shown in FIG. 1 in a first calibration plane.

FIGS. 1, 2, and 3 show an embodiment of a calibration device 100 for calibrating a depth camera 200. The calibration device 100 includes a base 10, a support column 20, and a crossbar 30. The support column 20 is coupled to the base 10 and extends along a first direction O. The crossbar 30 is coupled to the support column 20, and the crossbar 30 is used to connect a depth camera 200.

The crossbar 30 includes a positioning base 31 and a carrier 32. The positioning base 31 is fixed on the support column 20. The carrier 32 is rotationally coupled to the positioning base 31 about a second direction P perpendicular to the first direction O. The carrier 32 includes a distance sensor 321 and a calibration platform 322. The calibration platform 322 is used for mounting the depth camera 200. A third direction Q is perpendicular to the first direction O and the second direction P, and the carrier 32 rotates about the second direction P to drive an optical axis A of the depth camera 200 to rotate in a first calibration plane E defined by the first direction O and the third direction Q. The distance sensor 321 is configured to measure a distance between the depth camera 200 and a calibration surface α.

Referring to FIG. 3, the depth camera 200 is mounted to the calibration device 100 to make the optical axis A of the depth camera 200 face the calibration surface α. By setting the distance sensor 321 and the calibration platform 322 to be rotatable about the second direction P, a relative position between the optical axis A of the depth camera 200 and the calibration surface α is adjusted in the first calibration plane E. A specific calibration method is described in the following sections.

In one embodiment, the support column 20 is rotationally coupled to the base 10 about the first direction O. The base 10 includes a base body 11 and a first driver (not shown). The support column 20 is rotationally coupled to the base body 11, and a transmission shaft of the first driver is coupled to the support column 20. The support column 20 rotates about the first direction O to drive the optical axis A of the depth camera 200 to rotate in a second calibration plane F defined by the second direction P and the third direction Q.

Figure 4:
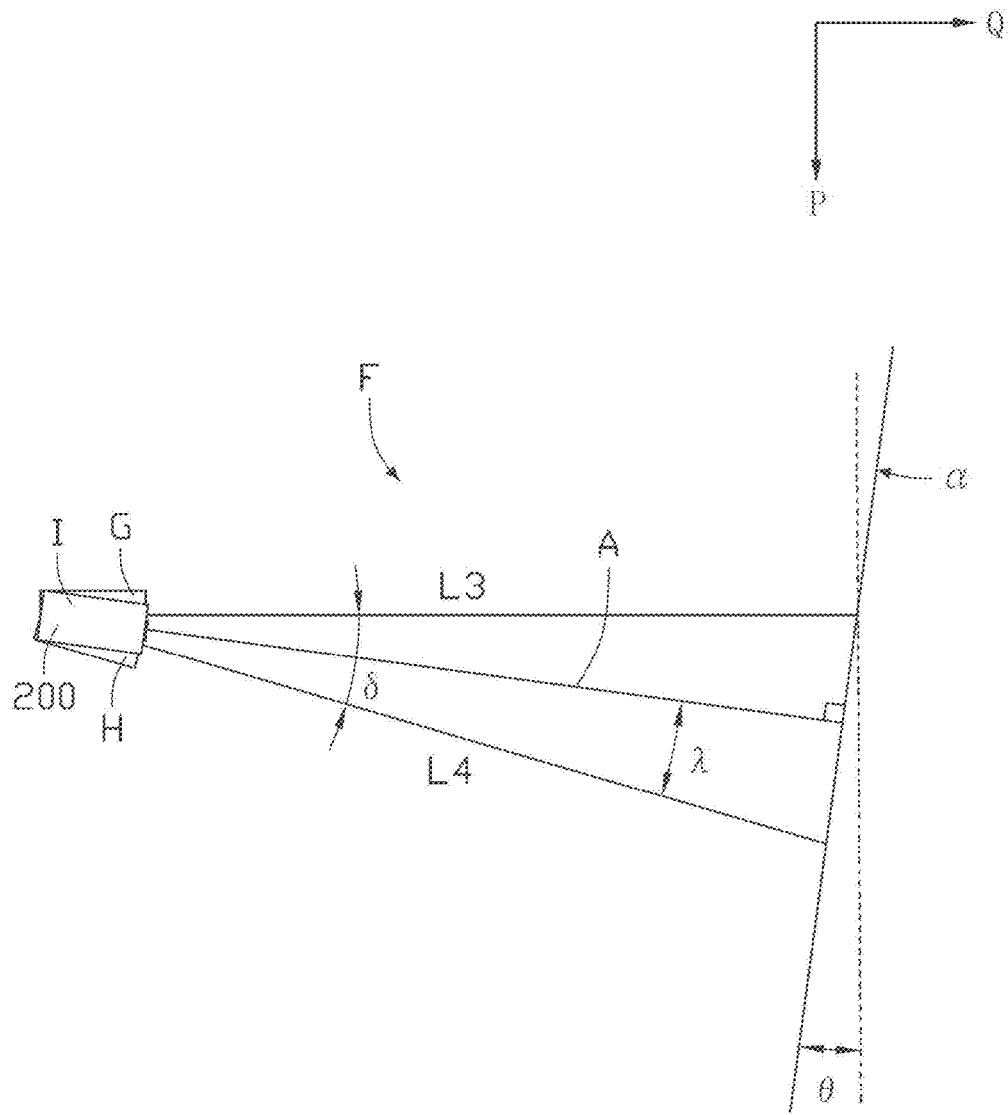
FIG. 4 is a schematic diagram of the calibration principle of the calibration device shown in FIG. 1 in a second calibration plane.

Referring to FIG. 4, by setting the support column 20 to be rotatable about the first direction O, the direction of the optical axis A of the depth camera 200 can be adjusted in the second calibration plane F. By further adjusting the relative position between the optical axis A and the calibration surface α, the optical axis A is adjusted to be perpendicular to the calibration surface α. A specific calibration method is described in the following sections.

In one embodiment, the base body 11 is made of an anti-vibration elastic material, such as rubber, to reduce the influence of external factors such as floor vibration on the accuracy of the calibration.

In one embodiment, the crossbar 30 further includes a second driver 35 for driving the distance sensor 321 and/or the calibration platform 322 to rotate about the second direction P.

In one embodiment, the calibration device 100 further includes a controller (not shown) electrically coupled to the first driver and the second driver 35 for controlling the first driver and the second driver 35 rotate.

In one embodiment, the controller 40 is a programmable logic controller, the first driver and the second driver 35 are stepper motors, and a positioning accuracy of the stepper motors is 0.05 degrees.

In one embodiment, the positioning base 31 is substantially a "U" shape in cross-section. The positioning base 31 includes a first mounting plate 312 and two first side plates 313 arranged respectively on two sides of the first mounting plate 312. The first mounting plate 312 and the two first side plates 313 cooperatively surround a holding space 311. The carrier 32 is rotationally received in the holding space 311 about the second direction P, and the second driver 35 is fixed on an outer side of one of the first side plates 313.

In one embodiment, the crossbar 30 further includes a rotating base 33. The distance sensor 321 and the calibration platform 322 are fixed on the rotating base 33, and the rotating base 33 rotates about the second direction P in the holding space 311.

The rotating base 33 includes a second mounting plate 331, a second side plate 332, and a third side plate 333. The second side plate 332 is arranged on one side of the second mounting plate 331, and the third side plate 333 is arranged on one side of the second mounting plate 331 adjacent to the second side plate 332. The distance sensor 321 and the calibration platform 322 are coupled to the third side plate 333, and the distance sensor 321 is located between the calibration platform 322 and the second side plate 332. The second side plate 332 is coupled to the second driver 35 by a first rotating shaft 3321, and the first rotating shaft 3321 is driven by the second driver 35 to rotate. The calibration platform 322 is rotationally coupled to the first side plate by a second rotating shaft 3221, and the second rotating shaft 3221 is coaxial with the first rotating shaft 3321.

In one embodiment, the calibration platform 322 is detachably coupled to the third side plate 333, so that a different calibration platform 322 can be applied to the depth camera 200 of different models or sizes.

Referring to FIG. 1, FIG. 2, and FIG. 3, a calibration method for the depth camera 200 includes the following steps:

S1: Provide the depth camera 200, which can be used in gesture control, 3D modeling, automotive radar, face recognition, and other fields.

S2: Mount the depth camera 200 on the calibration device 100 as described above, and adjust the optical axis A of the depth camera 200 to face the calibration surface α.

S3: When the depth camera 200 is located at a first position M, the distance sensor 321 senses a first distance L1 between the depth camera 200 and the calibration surface α.

S4: Rotate the distance sensor 321 and the calibration platform 322 clockwise (or counterclockwise) about the second direction P by a first preset angle β, so that the depth camera 200 rotates from the first position M to a second position N, and the distance sensor 321 senses a second distance L2 between the depth camera 200 and the calibration surface α.

S5: Calculate a first deviation angle γ between the calibration surface α and the first direction O according to the first preset angle β, the first distance L1, and the second distance L2. The first deviation angle γ is calculated according to the formula:

$$\gamma = 90° - \arcsin(\frac{L1\sin\beta}{\sqrt{(L1^2 + L2^2 - 2L1L2\cos\beta)}})$$

S6: Rotate the calibration platform 322 from the second position N about the third direction Q by a first compensation angle λ, so that the depth camera 200 rotates from the second position N to a third position S. In the third position S, the optical axis A of the depth camera 200 is perpendicular to an intersection line X of the first calibration plane E and the calibration surface α. A magnitude of the first compensation angle λ, is calculated according to the formula:

$$\lambda = |\beta - \gamma|$$

Wherein, if β−γ>0, the calibration platform 322 is rotated counterclockwise (or clockwise) about the second direction P by the first compensation angle λ, so that the depth camera 200 is rotated from the second position N to the third position S.

Wherein, if β−γ<0, the calibration platform 322 is rotated clockwise (or counterclockwise) about the second direction P by the first compensation angle λ, so that the depth camera 200 is rotated from the second position N to the third position S.

Referring to FIG. 1, FIG. 2, and FIG. 4, the calibration method further includes the following steps:

S7: The distance sensor 321 senses a third distance L3 between the depth camera 200 and the calibration surface α at a fourth position G.

S8: Rotate the support column 20 clockwise (or counterclockwise) about the first direction O by a second preset angle δ until the depth camera 200 reaches a fifth position H, and then the distance sensor 321 senses a fourth distance L4 between the depth camera 200 and the calibration surface α.

S9: Calculate a second deviation angle θ between the calibration surface α and the second direction P according to the second preset angle δ, the third distance L3, and the fourth distance L4. The second deviation angle θ is calculated according to the formula:

$$\theta = 90° - \arcsin(\frac{L3\sin\delta}{\sqrt{(L3^2 + L4^2 - 2L3L4\cos\delta)}})$$

S10: Rotate the support column 20 about the first direction O by a second compensation angle λ so that the depth camera 200 is rotated from the fifth position H to a sixth position I. At the sixth position I, the optical axis A of the depth camera 200 is perpendicular to the calibration surface α. A magnitude of the second compensation angle λ is calculated according to the formula:

$$\lambda = |\delta - \theta|$$

Wherein, if δ−θ>0, the support column 20 is rotated counterclockwise (or clockwise) about the first direction O by the second compensation angle λ, so that the depth camera 200 is rotated from the fifth position H to the sixth position I.

Wherein, if δ−θ<0, the support column 20 is rotated clockwise (or counterclockwise) about the first direction O by the second compensation angle λ, so that the depth camera 200 is rotated from the fifth position H to the sixth position I.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A calibration device comprising:
a base;
a support column coupled to the base, the support column extending in a first direction; and
a crossbar coupled to the support column; wherein:
the crossbar comprises a positioning base and a carrier;
the positioning base is fixed to the support column;
the carrier is coupled to the positioning base and rotatable about a second direction perpendicular to the first direction;
the carrier comprises a distance sensor and a calibration platform;
the calibration platform mounts a depth camera;
the carrier is configured to rotate about the second direction to rotate an optical axis of the depth camera in a first calibration plane defined by the first direction and a third direction;
the third direction is perpendicular to the first direction and the second direction;
the support column is coupled to the base and rotatable about the first direction, and the support column is configured to rotate about the first direction to rotate the optical axis of the depth camera in a second calibration plane defined by the second direction and the third direction;
the crossbar comprises a driver, and the driver is configured to rotate the distance sensor and/or the calibration platform about the second direction;
the positioning base comprises a first mounting plate and two first side plates arranged respectively on two sides of the first mounting plate, and the first mounting plate and the two side plates cooperatively surround a holding space for receiving the carrier; and
the driver is fixedly mounted on an outer side of one of the first side plates.

2. The calibration device of claim 1, wherein:
the carrier comprises a rotating base;
the distance sensor and the calibration platform are fixedly mounted on the rotating base; and
the rotating base is received in the holding space and rotatable about the second direction.

3. The calibration device of claim 2, wherein:
the rotating base comprises a second mounting plate, a second slide plate, and a third side plate;
the distance sensor and the calibration platform are mounted on the third surface, and the distance sensor is located between the calibration platform and the second side plate;
the second side plate is rotationally coupled to the driver by a first rotating shaft;
the calibration platform is rotationally coupled to the first side plate by a second rotating shaft; and
the second rotating shaft and the first rotating shaft extend along the second direction.

4. The calibration device of claim 3, wherein:
the calibration platform is detachably coupled to the third side plate.

5. The calibration device of claim 1, wherein:
the base body is made of an anti-vibration elastic material.

\* \* \* \* \*